Sept. 7, 1926.

J. W. HOLLY 1,599,051

VALUE LIMITING MEANS FOR COMMERCIAL PAPERS

Filed Dec. 1, 1922

Inventor

John W. Holly

By Lancaster Allwine

Attorneys

Patented Sept. 7, 1926.

1,599,051

UNITED STATES PATENT OFFICE.

JOHN W. HOLLY, OF TALCVILLE, NEW YORK.

VALUE-LIMITING MEANS FOR COMMERCIAL PAPERS.

Application filed December 1, 1922. Serial No. 604,256.

This invention relates to improvements in commercial instruments.

The primary object of this invention is the provision of a commercial instrument, either negotiable or non-negotiable, embodying an improved value limiting arrangement.

A further and important object of this invention is the provision of a check or analagous commercial instrument, which includes a body portion for receiving indicia involving a money transaction, and a portion referable to the body portion including a simple and compact arrangement of denominations for value limitation of the matter to be carried by the body portion.

Other objects and advantages of this invention will be apparent during the course of the following detailed description.

In the accompanying drawing, forming a part of this specification, and wherein similar reference characters designate corresponding parts throughout the several views:

Figure 1 is a face view of the improved instrument in the form of a check, showing the body portion thereof, and the improved value limiting means associated therewith.

Figure 2 is a face view of the check portions illustrated in Figure 1, however, showing the body portion of the check filled out, and its value limiting portion thereof severed in such manner as to indicate a limiting value referable to the subject matter of the body portion of the check.

In the drawing, wherein for the purpose of illustration is shown but the preferred embodiment of this invention, the letter A generally designates the improved instrument, which may be in the form of a check, draft, voucher, or any negotiable or non-negotiable paper, including a body portion 10, and a value limiting extension 11. The body portion 10 may be of any approved formation, and in the example of instrument embodying the novel value limiting arrangement, it is preferred that the check body portion 10 be of rectangular formation, having indicia 11ª thereon, and spaces adapted to receive data, including indicia 12 designating a money value. Thus, in the case of a check, the indicia 12 will be the amount for which the check is drawn.

The value limiting portion 11 of the instrument A, is preferably contiguous with the body portion 10, and fixed thereto. A vertical line 15 may subdivide the portions 10 and 11. Complete value limiting denominations 20 are disposed on the face of the portion 11, which in themselves do not need to be added to or detracted from in order to express the limiting value which is referable to the amount indicated on the body portion 10. The aim in providing the improved arrangement on the portion 11 has been that of compactness and simplicity, yet giving a relatively great number of complete denominations which will permit of a wide range of amounts which may be inscribed on the body portion. To this end, the denominations 20 are vertically arranged so as to be readable in the same direction as the subject matter on the body portion 10. A very important feature in the arrangement of the individually complete denominations 20, is in the fact that the digits of each denomination are in stepped or offset relation with respect to digits of an adjacent denomination. For compactness the ciphers of the denominations, and in particular the end ciphers of the denominations are in overlapping relation with the digit portions of adjacent denominations.

In following out the above arrangement of denominations 20 on the face of the extension 11, for clearness and distinctness, the denominations 20 may be arranged in diagonal rows 25, 26, etc., each of which rows contain a plurality of denominations, arranged as above described, and in numerical sequence from the lower marginal edge 28 of the instrument A. In this arrangement, it is to be noted that the top and bottom complete denominations of adjacent diagonal rows may have the digits and cipher portions thereof in overlapping relation, substantially as is illustrated in the drawing, wherein the ciphers of the one hundred dollar denomination are in overlapping relation with the digit portion 9 of the ninety dollar denomination.

In order to distinctly define the important parts of the denominations from each other, it is preferred to segregate the digit portions of each denomination in a space, as distinct from the digit portions of adjacent denominations. To this end, vertical guide lines 30 may be employed, in the manner above mentioned, which separates the denominations 20 from each other, in so far as the digit portions thereof are concerned. However, it is to be noted that the digit portion and the cipher portion of adjacent denominations may be in the same space intermediate the vertical line 30. This, however, detracts in no way from the efficiency of the arrangement, but is important in providing for compactness, which is most desired in this type of instrument for obvious reasons. If desired, horizontal lines or analagous delineations 31 may be employed to entirely dubdivide adjacent denominations.

In the example shown, in Figure 2, the check is drawn for one hundred and eighteen dollars. The denominations 20 on the value limiting portion 11, between which the one hundred and eighteen dollar amount falls, are the one hundred and ten dollar denomination, and the one hundred and twenty dollar denomination. To properly protect the instrument against being raised or altered to increase the amount one hundred and eighteen dollars, the instrument portion 11 is severed on the vertical guide line 30 between the digit portions of the one hundred and twenty and one hundred and thirty denominations, substantially as is illustrated in Figure 2. It is obvious, even by a casual glance, that the one hundred and twenty denomination is the value limit of the amount indicated on the body portion 10.

From the foregoing description of this invention, it can readily be understood that a distinct series of value limiting denominations have been provided, in that the same are vertically arranged so as to be readable in the same direction as the subject matter of the body portion of the instrument, thus permitting of any desired height of the denomination figures, so as to make them distinct. In other words, the height of the digits and ciphers of the denomination are not limited by the width of the spaces in which they are disposed. The straight edge, upon which the value limiting portion 11 has been severed is important, as it has been found that offset and fragmentary edges, such as is provided in connection with the filling out of money orders, are undesirable, in that the same easily become torn and crumpled at the offet portion.

Various changes in the shape, arrangement of denominations, substitution of equivalents, and application of the value limiting feature of this invention to various types of commercial paper, may be made to the form of the invention herein shown and described, without departing from the spirit of the invention or the scope of the claims.

I claim:—

1. An instrument of the class described comprising a body portion adapted to receive indicia designating a money value, and a valve limiting portion fixedly extending from the body portion having a plurality of narrow vertical spaces subdivided from each other by parallel guide lines, and having a diagonal series of numerical denominations thereon in sequence with only the digit or digits of a single denomination appearing in any single vertical space.

2. An instrument of the class described comprising a body portion adapted to receive indicia designating a money value, and a value limiting portion fixedly extending from the body portion having a plurality of narrow vertical spaces subdivided from each other by parallel guide lines, and having a diagonal series of numerical denominations thereon in sequence with only the digit or digits of a single denomination appearing in any single vertical space, the denominations of the series being in stepped relation with each other with the ciphers, of the denominations that have them, disposed in overlapped relation with the digits of an adjacent denomination and in the same vertical space therewith.

3. An instrument of the class described comprising a body portion, and a portion fixedly extending therefrom having value limiting numerals thereon in complete denominations referable to indicia to be placed on said body portion, and arranged in stepped relation so that the digits are disposed in overlapped relation with ciphers of adjacent numerals.

4. An instrument of the class described comprising a body portion, and a value limiting portion provided with a plurality of complete value limiting denominations extending diagonally thereon and arranged so that the digits of adjacent denominations are in offset relation with the end ciphers of said denominations in overlapping relation with adjacent denominations.

5. An instrument of the class described comprising a body portion, and a value limiting portion referable to said body portion and being provided with a diagonally disposed column of complete denominations thereon in numerical sequence, the digits of each denomination in said diagonal columns of denominations being in stepped relation with the digits of adjacent denominations, the end ciphers of each denomination in the diagonal columns of denominations being in overlapping relation with the digits of an adjacent denomination, said value limiting portion having guide means subdividing the digit portions of said denominations with respect to each other, said denominations being arranged on the value limiting portion of the instrument so as to read in the same direction as the subject matter of said body portion.

6. An instrument of the class described comprising a body portion, and a value limiting portion referable to said body portion being provided with a plurality of series of diagonally arranged numerical denominations thereon in sequence, the digits of each of said denominations being in stepped relation with respect to each other with the end ciphers of each of said denominations being in overlapping relation with the digits of adjacent denominations, the digits and ciphers of upper and lower denominations of different diagonal series being in overlapping relation, said value limiting portion having vertical guide lines thereon subdividing the digit portions of said denominations with respect to said denominations, said denominations being arranged on the value limiting portion so as to read in the same direction as the subject matter of the body portion of said instrument.

JOHN W. HOLLY.